United States Patent [19]

Hoffman, Jr.

[11] 4,120,232

[45] Oct. 17, 1978

[54] SOCKET LUG ASSEMBLY FOR AIRCRAFT STORES

[75] Inventor: Charles R. Hoffman, Jr., Fort Walton Beach, Fla.

[73] Assignee: The United States of America as represented by the Secretary of the Air Force, Washington, D.C.

[21] Appl. No.: 787,680

[22] Filed: Apr. 14, 1977

[51] Int. Cl.² ................ B64C 1/22; F16D 1/00; F41F 5/02

[52] U.S. Cl. .................... 89/1.5 R; 85/5 B; 244/137 R; 294/83 AA; 403/316

[58] Field of Search ............. 89/1.5 R, 1.5 C, 1.5 F, 89/1.5 G; 244/137 R; 294/83 AA; 403/DIG. 8, 316, 325, 327; 85/5 B

[56] References Cited

U.S. PATENT DOCUMENTS

| | | | |
|---|---|---|---|
| 1,923,025 | 8/1933 | Morse et al. | 85/5 B |
| 2,420,746 | 5/1947 | Heidman et al. | 294/83 AA |
| 2,693,980 | 11/1954 | Heidman | 294/83 AA |
| 2,816,471 | 12/1957 | Bachman | 85/5 B |
| 2,888,294 | 5/1959 | Savarieau | 294/83 AA |
| 3,002,368 | 10/1961 | Moberg | 85/5 B X |
| 3,469,871 | 9/1969 | Betts | 403/325 |
| 3,887,150 | 6/1975 | Jakubowski | 244/137 R |

FOREIGN PATENT DOCUMENTS

| | | | |
|---|---|---|---|
| 63,061 | 3/1955 | France | 294/83 AA |
| 859,458 | 1/1961 | United Kingdom | 89/1.5 F |

*Primary Examiner*—David H. Brown
*Attorney, Agent, or Firm*—Joseph E. Rusz; Arsen Tashjian

[57] ABSTRACT

A socket lug assembly for attaching bombs and the like to bomb racks and/or other attachment points on an aircraft. A spring-loaded spindle locks multiple spheres in place securing the lug with attached store. An externally operated lever moves the spindle to the release position when activated allowing the spheres to move inward, freeing the lug to fall away from the attached assembly. The spindle is held in the release position by a spring-operated sear. When the next store is loaded, the lug urges the sear out of the spindle detent allowing the spindle spring to force the spindle to the "lock" position securing the lug with attached store to the rack.

3 Claims, 2 Drawing Figures

SOCKET LUG ASSEMBLY FOR AIRCRAFT STORES

STATEMENT OF GOVERNMENT INTEREST

The invention described herein may be manufactured and used by or for the Government for governmental purposes without the payment of any royalty thereon.

BACKGROUND OF THE INVENTION

This invention relates to an assembly for releasably attaching external and/or internal stores to an aircraft and, more particularly, the invention is concerned with providing a socket lug assembly having no hooks and having automatic latching with a means for increasing the locking force when the downward load is increased.

Heretofore, it has been conventional to attach an aircraft store such as a bomb to the bomb rack by means of a hook arrangement or the like. Many times the hook holding the store is only partially closed resulting in a dangerous condition where the store may be accidentally dropped from the aircraft. Also, considerable time and effort are involved in attaching the store to the bomb rack because the hook must be opened manually prior to installation of the store and then set for release on signal. When two assemblies are used in a dependent unlatching hook arrangement, it is generally necessary to install the stores in a special predetermined order which requires complex procedural operations. Also, when hooks are used to attach the store to the bomb rack, sway braces are needed to take the roll moments which occur during aircraft operation.

Thus, it would be most desirable to provide an assembly for releasably attaching stores to an aircraft without using hooks or hook type elements. This would eliminate the danger of partially open hooks and premature release of the store. Also, an automatic latching system would reduce the time for securing the store to the rack and allow the store to be installed with a minimum of effort. When two assemblies are used, it would be preferable to attach each of the store independently and still be able to release them through a dependent unlatching arrangement. Also, the roll moments should be taken by the assembly thereby eliminating the need for sway braces. The hereinafter described invention does, in fact, provide an assembly having all of these highly desirable features with none of the drawbacks of the presently available stores attaching arrangements.

SUMMARY OF THE INVENTION

The present invention is concerned with providing a socket lug assembly for attaching bombs and/or other stores to bomb racks and other attachment points on the aircraft. A spring-loaded spindle locks a plurality of metal spheres in position to secure the lug and attached store. An externally operated lever moves the spindle axially upward allowing the spheres to move radially inward into a space formed by a reduction in the diameter of the spindle thereby releasing the lug with the bomb attached thereto. Features include a spring operated sear to engage the spindle and an inclined surface on the spindle at the sphere engaging position to increase the downward or locking force of the spindle as the suspended load increases.

Accordingly, it is an object of the invention to provide a socket lug assembly for aircraft stores wherein no hooks are needed in order to attach the store to the rack. This eliminates the danger associated with stores held by partially open or incompletely closed hooks.

Another object of the invention is to provide a socket lug assembly for attaching aircraft stores to a bomb rack or the like wherein an automatic latching arrangement reduces the time and effort required for securing the store to the rack.

Still another object of the invention is to provide a socket lug assembly wherein a sloping surface on the spindle assures increased locking force when the downward load on the lug is increased. This is achieved by forcing a plurality of spheres inward thereby urging the spindle downward relative to the lug.

A further object of the invention is to provide a socket lug assembly for aircraft stores wherein roll moments are taken by the assembly thereby eliminating the need for sway braces on the store.

A still further object of the invention is to provide an aircraft bomb rack having a plurality of interconnected socket lug assemblies for releasably holding a plurality of bombs wherein connecting links between the assemblies assures dependent unlatching while still allowing independent latching of each store to the rack.

Another still further object of the invention is to provide a socket lug assembly suitable for use on all aircraft which carry stores, both externally and internally, which are required to be separated from the aircraft, either to satisfy operational or maintenance requirements.

These and other objects, features and advantages will become more apparent after considering the following detailed description taken in conjunction with the annexed drawings and appended claims.

DESCRIPTION OF A PREFERRED EMBODIMENT

Figure 1:
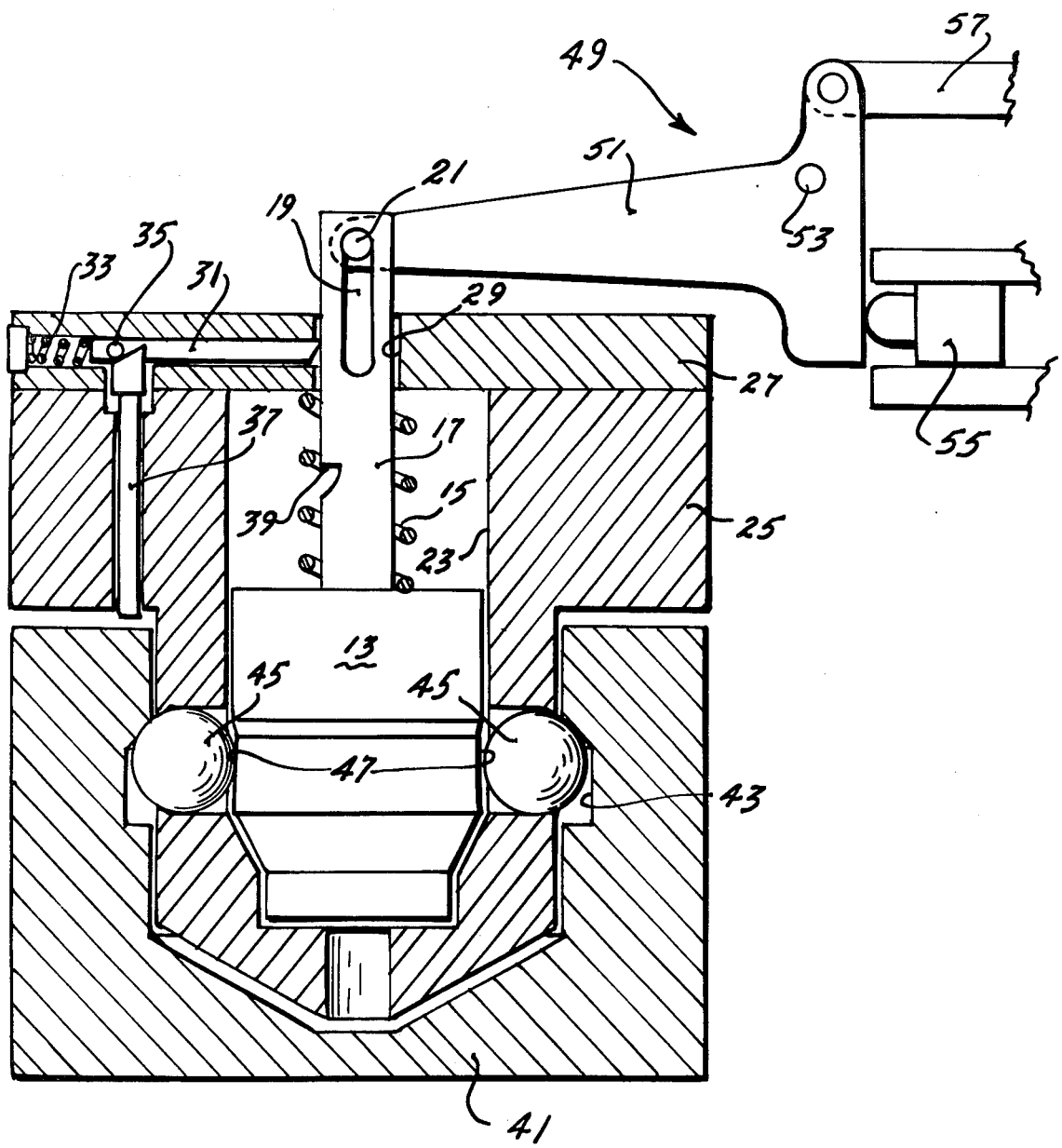
FIG. 1 is a cross-sectional view of the socket lug assembly according to the invention in the latched position showing the plurality of spheres in engagement with the lug.

Referring now to the drawings, in FIG. 1 there is shown in cross-section a socket lug assembly according to the invention in the latched position. The spindle 13 is urged downward by the spring 15 which surrounds the rod member 17. A slotted opening 19 is positioned through the upper end of the rod member 17 with a pivot pin 21 disposed through the opening 19. The spindle 13 is slidably disposed in a cylinder 23 in the block member 25 which is fixedly attached to the bomb rack (not shown). A cover member 27 attached to the top of the block 25 is provided with a central opening 29 through which the rod 17 slides in the vertical direction. A sear 31 is slidably disposed through the cover member 27 for radial movement therein and a spring 33 in contact with the outer end of the sear 31 urges the sear 31 inward against the side of the rod 17. An outstanding pin 35 near the outer end of the sear 31 engages the sloping surface of a trigger 37 such that the upward movement of the trigger 37 produces a corresponding outward movement of the sear 31. A detent 39 in the rod 17 of the spindle 13 engages the inward end of the sear when the road 17 is in its upward release position and prevents the spring 15 from biasing the spindle 13 downward.

A lug 41 having a groove 43 on the inner wall surface is positioned over the lower end of the block 25. The upper edge of the groove 43 in the lug 41 is angularly oriented for engagement with a plurality of metal spheres 45 positioned in the block 25 for radial movement therein. The metal spheres 45 also engage an inclined surface 47 on the spindle 13. A linkage arrangement 49 includes the link 51 adapted to rotate around the pivot 53 when a force is applied by the element 55. The pivot pin 21 disposed in the opening 19 on the rod 17 is attached to inner end of the link 51 so that the clockwise rotation of the link 51 causes a corresponding upward movement of the rod 17 and spindle 13. Another link 57 moves radially outward when the link 51 is caused to rotate clockwise.

Figure 2:
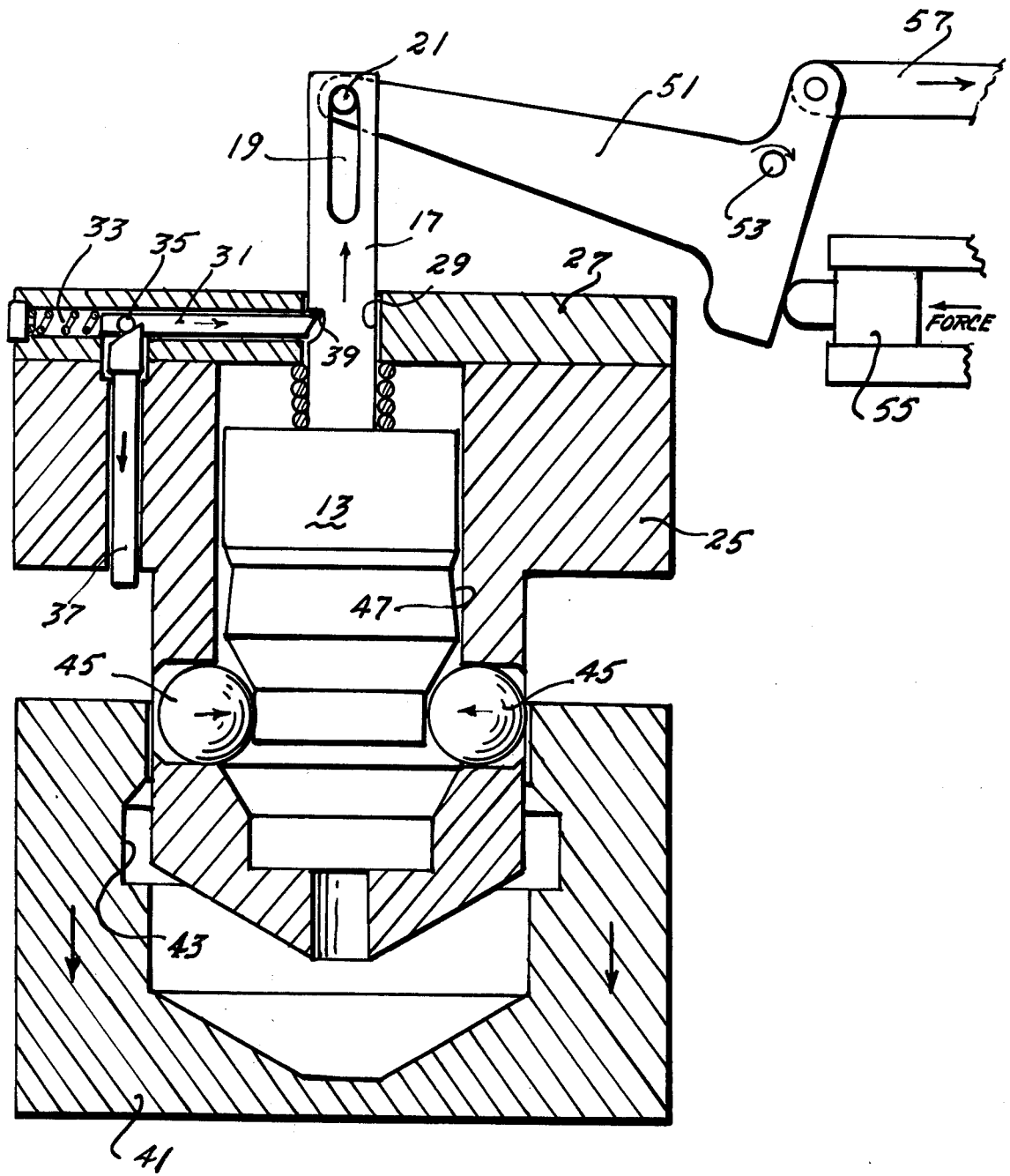
FIG. 2 is a cross-sectional view of the socket lug assembly in the unlatched position showing the spindle in the axially upward position allowing the spheres to move radially inward and release the lug which is shown falling away.

In operation, in the carrying position as shown in FIG. 1, the store (not shown) is attached to the lug 41 which is released when the store is dropped. To release the lug 41, the linkage 49 is caused to rotate by applying an inward radial force at element 55 which causes link 51 to rotate about the pivot 53, lifting the inner end of the link 51 with the pin 21 in the opening 19 upward. This produces an upward movement of the rod member 17 and spindle 13 and causes the spring 15 to be compressed. As the spindle 13 moves upward, the metal spheres 45 become free to move inward because of the reduced diameter at the lower end of the spindle 13. This is shown most clearly in FIG. 2. This releases the lug 41 permitting it to fall away. Further upward movement of the spindle 13 in response to the force of element 55 causes the sear 31 to align with the detent 39 and the spring 33 urges the sear 31 to fall into the detent 39. The outstanding pin 35 moves inward and causes the trigger 37 to move downward.

In order to secure the lug 41 with store attached to the bomb rack, the lug 41 is slipped upward over the block 25. When the lug 41 is almost all the way up in position, the upper surface thereof contacts the lower end of the trigger 37 causing it to move upward against the pin 35 which moves the sear 31 radially outward from the detent 39. This allows the spindle 13 to move downward upon the urging of the spring 15. The metal spheres 45 are forced outward into the groove 43 in the lug 41 causing the lug 41 to become locked in position. The inclined surface 47 on the spindle 13 at the sphere engaging position effectively operates to increase the locking force as the suspended load increases.

Although the invention has been illustrated in the foregoing specification in terms of a preferred embodiment thereof, the invention is not limited to this embodiment or to the particular configuration shown and described. It will be apparent to those skilled in the art that certain changes, modifications and substitutions can be made, particularly with respect to the shape and positioning of the various elements without departing from the true spirit and scope of the appended claims. For example, although the lug assembly shown is activated by using a linkage arrangement, it can be seen that any direct upward movement of the spindle 13 as by means of a solenoid coil or the like would operate equally as well as the linkage shown.

Having thus set forth the nature of my invention, what I claim and desire to secure by Letters Patent of the United States is:

1. A socket lug assembly for releasably attaching a store and the like to a bomb rack on an aircraft, said socket lug assembly comprising a cylindrical spindle positioned in a block for vertical slidable movement therein, said spindle having a reduced diameter at the lowermost end portion, a rod member extending upwardly from said spindle, a coil spring disposed around said rod member for urging said spindle downward, a lug for attaching a store thereto positioned over the outer lower end of said block, a groove on the inner wall surface of said lug, a plurality of metal spheres positioned in the groove in said lug and in contact with an inclined surface on said spindle, said groove having an inclined upper surface for forcing said plurality of metal spheres inwardly against the inclined surface of said spindle in response to additional downward force applied to said lug, and means for providing upward movement to said rod member with said spindle attached such that the reduced diameter of said spindle is in line with the metal spheres allowing said plurality of spheres to move inwardly out of the groove in said lug thereby releasing said lug from said block.

2. The socket lug assembly defined in claim 1 wherein said means for providing upward movement to said rod member with said spindle attached includes a link pivotally attached to the upper end of said rod and a force applying element in contact therewith to cause said link to rotate and lift said rod upward.

3. The socket lug assembly defined in claim 1 including means for automatically latching said lug to said spindle in said block when said lug is pushed upward into position around said block, said latching means comprising a vertical trigger positioned in said block for slidable movement therein, a horizontal sear positioned in said block for radial slidable movement therein, the inner end of said sear being disposed in a detent in said rod member when said rod member is in the upper release position, an outstanding pin near the outer end of said pin, the upper end of said trigger being inclined in contact with said outstanding pin whereby upward movement of said trigger when said lug is in assembled position causes said sear to move outward releasing said spindle for downward movement forcing the metal spheres into the groove in said lug thereby latching the lug assembly.

* * * * *